(12) United States Patent
Kim et al.

(10) Patent No.: US 12,223,132 B2
(45) Date of Patent: Feb. 11, 2025

(54) DISPLAY DEVICE AND METHOD OF DRIVING THE SAME

(71) Applicant: Samsung Display Co., Ltd., Yongin-Si (KR)

(72) Inventors: Min Hong Kim, Yongin-si (KR); Tae Joon Kim, Yongin-si (KR); Jung Mok Park, Yongin-si (KR); Jin Woo Park, Yongin-si (KR); Hyun Wook Cho, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/211,487

(22) Filed: Jun. 19, 2023

(65) Prior Publication Data

US 2024/0220044 A1 Jul. 4, 2024

(30) Foreign Application Priority Data

Dec. 28, 2022 (KR) .......................... 10-2022-0187724

(51) Int. Cl.
*G06F 3/041* (2006.01)
*G09G 3/20* (2006.01)

(52) U.S. Cl.
CPC ......... *G06F 3/0416* (2013.01); *G09G 3/2096* (2013.01); *G09G 2300/0842* (2013.01)

(58) Field of Classification Search
None
See application file for complete search history.

(56) References Cited

U.S. PATENT DOCUMENTS

| 10,394,361 B2 | 8/2019 | Park |
| 2018/0033406 A1* | 2/2018 | Park ..................... G09G 3/2074 |
| 2022/0066881 A1* | 3/2022 | Jeon ..................... G06F 11/0742 |

FOREIGN PATENT DOCUMENTS

| KR | 10-1090353 B1 | 12/2011 |
| KR | 10-2018-0078705 A | 7/2018 |
| KR | 10-2021-0025341 A | 3/2021 |
| KR | 10-2022-0028692 A | 3/2022 |

* cited by examiner

*Primary Examiner* — Stephen T. Reed
(74) *Attorney, Agent, or Firm* — Innovation Counsel LLP

(57) ABSTRACT

According to an embodiment of the disclosure, a display device includes a sensor driver receiving firmware from an host in which the firmware is stored, the sensor driver including a second memory storing the firmware supplied from the host and initialized when a reset signal is supplied from the host, and a sensing unit for supplying a recovery signal corresponding to an abnormal state of the sensor driver to the host while sensing at least one of an internal voltage and a clock signal of the sensor driver.

20 Claims, 9 Drawing Sheets

DISPLAY DEVICE AND METHOD OF DRIVING THE SAME

This application claims priority to Korean Patent Application No. 10-2022-0187724, filed on Dec. 28, 2022, and all the benefits accruing therefrom under 35 U.S.C. § 119, the content of which in its entirety is herein incorporated by reference.

BACKGROUND

1. Field

The disclosure relates to a display device and a method of driving the same.

2. Description of the Related Art

As information technology develops, importance of a display device, which is a connection medium between a user and information, has been highlighted. In response to this, a use of a display device such as a liquid crystal display device and an organic light emitting display device is increasing.

The display device includes an application processor and a sensor driver. The sensor driver senses a touch input and the application processor provides firmware so that the sensor driver may be driven.

The sensor driver may store the firmware provided from the application processor in a flash memory and update the firmware stored in the flash memory in a RAM.

When the flash memory is removed from the sensor driver to reduce a cost, the firmware may be directly updated from the application processor to the RAM of the sensor driver. Meanwhile, when the sensor driver is abnormally driven, the application processor may supply the firmware again after resetting the sensor driver, and in this case, the touch input may not be sensed during a predetermined time.

SUMMARY

An object of the disclosure is to provide a display device which is capable of sensing an operation of a sensor driver using a sensing unit positioned inside the sensor driver and a method of driving the same.

An object of the disclosure is to provide a display device which is capable of supplying a recovery signal using a recovery channel when a sensor driver is abnormally driven and quickly receiving firmware from an application processor in response to the recovery signal and a method of driving the same.

According to an embodiment of the disclosure, a display device includes a sensor driver receiving firmware from a host in which the firmware is stored, the sensor driver including a second memory storing the firmware supplied from the host and initialized when a reset signal is supplied from the host. The sensor driver includes a second memory storing the firmware supplied from the host and initialized when a reset signal is supplied from the host, and a sensing unit for supplying a recovery signal corresponding to an abnormal state of the sensor driver to the host while sensing at least one of an internal voltage and a clock signal of the sensor driver.

According to an embodiment, the recovery signal is supplied from the sensor driver to an application processor disposed in the host through a recovery channel, and the recovery channel includes a first terminal included in the host and receiving the recovery signal, and a second terminal included in the sensor driver and outputting the recovery signal.

According to an embodiment, the host includes an application processor which sequentially supplies the reset signal and the firmware to the sensor driver when the recovery signal is input.

According to an embodiment, the host includes an application processor which supplies the firmware to the sensor driver when the recovery signal is input.

According to an embodiment, the host includes a first memory which is a nonvolatile memory and the second memory is a volatile memory.

According to an embodiment, the sensing unit includes an internal voltage determiner for receiving the internal voltage and generating the recovery signal when the internal voltage is not within a first range, and a clock signal determiner for receiving the clock signal and generating the recovery signal when a frequency of the clock signal is not within a second range.

According to an embodiment, first threshold values corresponding to the first range and second threshold values corresponding to the second range are stored in the second memory.

According to an embodiment, the first threshold values and the second threshold values are stored in the first memory, and supplied to the second memory together with the firmware.

According to an embodiment, the host includes an application processor which includes a first memory.

According to an embodiment, the reset signal is supplied via a reset channel.

According to an embodiment, the host includes an application processor which supplies the firmware stored in a first memory in the host to the second memory using a communication channel.

According to an embodiment, the sensor driver further includes a touch controller for generating a touch signal by dividing the clock signal.

According to an embodiment, the display device further includes a display driver for generating a data signal corresponding to data supplied from an application processor in the host, and a panel displaying a predetermined image in response to the data signal supplied from the display driver.

According to an embodiment of the disclosure, a display device including an application processor, a sensor driver for sensing a touch input, a communication channel connected between the application processor and the sensor driver for transmitting and receiving data, a reset channel connected between the application processor and the sensor driver for transmitting a reset signal corresponding to initialization of the sensor driver, and a recovery channel connected between the application processor and the sensor driver for transmitting a recovery signal corresponding to an abnormal state of the sensor driver.

According to an embodiment, the reset signal is supplied from the application processor to the sensor driver, and the recovery signal is supplied from the sensor driver to the application processor when an internal voltage or a clock signal of the sensor driver is not within a predetermined range.

According to an embodiment, the recovery channel includes a first terminal included in the application processor and receiving the recovery signal, and a second terminal included in the sensor driver and outputting the recovery signal.

According to an embodiment of the disclosure, a method of driving a display device includes sensing a touch input in a sensor driver, sensing at least one of an internal voltage and a frequency of a clock signal of the sensor driver, generating a recovery signal and transferring the recovery signal to an application processor when the internal voltage is not within a first range or the frequency of the clock signal is not within a second range, and sequentially supplying a reset signal and firmware from the application processor to the sensor driver.

According to an embodiment, the sensor driver loads the firmware after the sensor driver is initialized by the reset signal.

According to an embodiment, first threshold values corresponding to the first range and second threshold values corresponding to the second range are supplied from the application processor to the sensor driver together with the firmware.

According to an embodiment, the recovery signal is transmitted through a recovery channel which is different from a communication channel for transmitting and receiving data between the application processor and the sensor driver and a reset channel through which the reset signal is transmitted from the application processor to the sensor driver.

Objects of the disclosure are not limited to the object described above, and other technical objects which are not described will be clearly understood by those skilled in the art from the following description.

In accordance with the display device and the method of driving the same according to embodiments of the disclosure, the recovery signal may be supplied to the application processor in response to an abnormal driving of the sensor driver, thereby minimizing an abnormal driving time of the sensor driver.

However, an effect of the disclosure is not limited to the above-described effect, and may be variously extended within a range that does not deviate from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
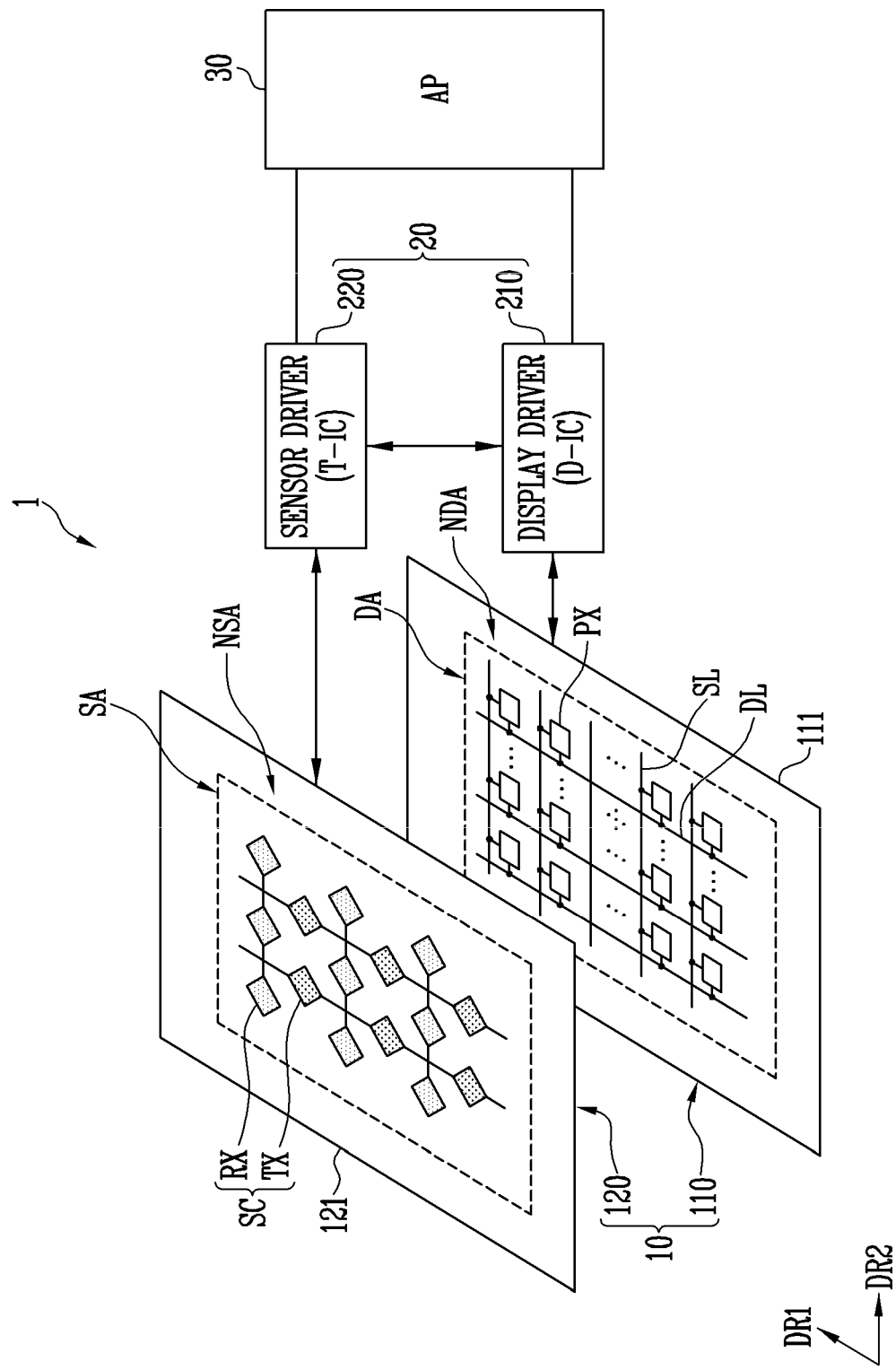
FIG. 1 is a diagram illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same." That is, the expression "is the same" may be the same enough for those of ordinary skill to understand that it is the same. Other expressions may also be expressions in which "substantially" is omitted.

FIG. 1 is a diagram illustrating a display device according to an embodiment of the disclosure.

Referring to FIG. 1, the display device 1 includes a panel 10 and a driving circuit unit 20 for driving the panel 10. The display device 1 may be electrically connected to an application processor 30 disposed in a host 40. The application processor 30 may be included in the display device 1.

The panel 10 may include a display unit 110 for displaying an image and a sensor unit 120 for sensing touch, pressure, fingerprint, hovering, biometric information (or a biometric characteristic), and the like. For example, the panel 10 may include pixels PX and sensors SC positioned to overlap at least a portion of the pixels PX. In an embodiment, the sensors SC may include first sensors TX (or a driving electrode) and second sensors RX (or a sensing electrode). In another embodiment (for example, in a self-capacitance mode), the sensors SC may be configured as one type of sensors without distinction between the first sensors TX and the second sensors RX.

The driving circuit unit 20 may include a display driver 210 for driving the display unit 110 and a sensor driver 220 for driving the sensor unit 120. For example, the pixels PX may display an image in a display frame period unit. For example, the sensors SC may sense an input of a user in a sensing frame period unit. A sensing frame period and a display frame period may be independent of each other and may be different from each other. The sensing frame period and the display frame period may be synchronized with each other or may be asynchronous.

According to an embodiment, the display unit 110 and the sensor unit 120 may be separately manufactured, and then disposed and/or combined so that at least one area overlaps. Alternatively, in another embodiment, the display unit 110 and the sensor unit 120 may be integrally manufactured. For example, the sensor unit 120 may be directly formed on at least one substrate configuring the display unit 110 (for example, an upper substrate and/or a lower substrate of the display panel, or a thin film encapsulation layer), or other insulating layers or various functional layer (for example, an optical layer or a protective layer).

Meanwhile, in FIG. 1, the sensor unit 120 is disposed on a front surface (for example, an upper surface on which an image is displayed) of the display unit 110, but a position of the sensor unit 120 is not limited thereto. For example, in another embodiment, the sensor unit 120 may be disposed on a rear surface or both surfaces of the display unit 110. In still another embodiment, the sensor unit 120 may be disposed on at least one edge area of the display unit 110.

The display unit 110 may include a display substrate 111 and a plurality of pixels PX formed on the display substrate 111. The pixels PX may be disposed in a display area DA of the display substrate 111.

The display substrate 111 may include a display area DA where an image is displayed and a non-display area NDA outside the display area DA. According to an embodiment, the display area DA may be disposed in a center area of the display unit 110 and the non-display area NDA may be disposed in an edge area of the display unit 110 to surround the display area DA.

The display substrate 111 may be a rigid substrate or a flexible substrate, and a material or a physical property is not particularly limited. For example, the display substrate 111 may be a rigid substrate configured of organic or tempered glass, or a flexible substrate configured of a thin film of a plastic or metal material.

Scan line SL, data lines DL, and the pixels PX connected to the scan lines SL and the data lines DL are disposed in the display area DA. The pixels PX are selected by a scan signal of a turn-on level supplied from the scan lines SL, receive a data signal from the data lines DL, and emit light of a luminance corresponding to the data signal. Therefore, an image corresponding to the data signal is displayed in the display area DA. In the disclosure, a structure, a driving method, and the like of the pixels PX are not particularly limited. For example, each of the pixels PX may be implemented with a pixel employing various currently known structures and driving methods.

In the non-display area NDA, various lines and/or a built-in circuit unit connected to the pixels PX of the display area DA may be disposed. For example, a plurality of lines for supplying various power and control signals to the display area DA may be disposed in the non-display area NDA, and a scan driver or the like may be further disposed in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, each of the pixels PX is not limited to a case where only an organic light emitting element is included. For example, the light emitting element of each of the pixels PX may be configured of an organic light emitting diode, an inorganic light emitting diode, a quantum dot/well light emitting diode, or the like. A plurality of light emitting elements may be provided in each of the pixels PX. The plurality of light emitting elements may be connected in series, parallel, series-parallel, or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The sensor unit 120 includes a sensor substrate 121 and a plurality of sensors formed on the sensor substrate 121. The sensors may be disposed in a sensing area SA on the sensor substrate 121.

The sensor substrate 121 may include the sensing area SA in which a touch input or the like may be sensed and a peripheral area NSA outside the sensing area SA. According to an embodiment, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when the touch input or the like is provided on the display area DA, the touch input may be detected through the sensor unit 120.

The sensor substrate 121 may be a rigid or flexible substrate, and may be configured of at least one insulating layer. In addition, the sensor substrate 121 may be a transparent or translucent light-transmitting substrate, but is not limited thereto. That is, in the disclosure, a material and a physical property of the sensor substrate 121 are not particularly limited. For example, the sensor substrate 121 may be a rigid substrate configured of glass or tempered glass, or a flexible substrate configured of a thin film of a plastic or metal material. In addition, according to an embodiment, at least one substrate (for example, the display substrate 111, an encapsulation substrate and/or a thin film encapsulation layer) configuring the display unit 110, an insulating layer, a functional layer, or the like of at least one layer disposed in an inside and/or on an outer surface of the display unit 110 may be used as the sensor substrate 121.

The sensing area SA is set as an area capable of responding to the touch input (that is, an active area of a sensor). To this end, the sensors SC for sensing the touch input or the like may be disposed in the sensing area SA. According to an embodiment, the sensors SC may include the first sensors TX and the second sensors RX.

For example, each of the first sensors TX may extend in a first direction DR1. The second sensors RX may extend in a second direction DR2. The second direction DR2 may be different from the first direction DR1. For example, the second direction DR2 may be a direction crossing the first direction DR1. In another embodiment, an extension direction and an arrangement direction of the first sensors TX may follow a conventional configuration. Each of the first sensors TX may have a form in which first cells of a relatively large area and first bridges of a relatively narrow area may be connected. In addition, in FIG. 1, each of the first cells is shown in a diamond shape, but each of the first cells may be configured in various conventional shapes such as a circle, a quadrangle, a triangle, and a mesh form. For example, the first bridges may be integrally formed on the same layer as the first cells. In another embodiment, the first bridges may be formed on a layer different from that of the first cells and may electrically connect adjacent first cells.

For example, each of the second sensors RX may extend in the second direction DR2. The second sensors RX may be arranged in the first direction DR1. In another embodiment, an extension direction and an arrangement direction of the second sensors RX may follow another conventional configuration. Each of the second sensors RX may have a form in which second cells of a relatively large area and second bridges of a relatively narrow area are connected. In FIG. 1, each of the second cells is shown in a diamond shape, but may be configured in various conventional shapes such as a circle, a quadrangle, a triangle, and a mesh form. For example, the second bridges may be integrally formed on the same layer as the second cells. In another embodiment, the second bridges may be formed in a layer different from that of the second cells and may electrically connect adjacent second cells.

According to an embodiment, each of the first sensors TX and the second sensors RX may have conductivity and include at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. At this time, the first sensors TX and the second sensors RX may be configured in a mesh form. In addition, the first sensors TX and the second sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, graphene, and the like. In addition, the first sensors TX and the second sensors RX may have conductivity and include at least one of various conductive materials. In addition, each of the first sensors TX and the second sensors RX may be formed of a single layer or multiple layers, and a cross-sectional structure thereof is not particularly limited.

Meanwhile, the sensor lines for electrically connecting the first and second sensors TX and RX to the sensor driver 220 and the like may be intensively disposed in the peripheral area NSA of the sensor unit 120.

The driving circuit unit 20 may include the display driver 210 for driving the display unit 110 and the sensor driver 220 for driving the sensor unit 120. In an embodiment, the display driver 210 and the sensor driver 220 may be configured of integrated chips (ICs) separated from each other. In another embodiment, at least a portion of the display driver 210 and the sensor driver 220 may be integrated together in one IC.

The display driver 210 is electrically connected to the display unit 110 to drive the pixels PX. For example, the display driver 210 may include the data driver and a timing controller, and the scan driver may be separately mounted in the non-display area NDA of the display 110. In another embodiment, the display driver 210 may include all or at least a portion of the data driver, the timing controller, and the scan driver.

The timing controller included in the display driver 210 may control the data driver. For example, the timing controller may supply a control signal and digital data to the data driver, and the data driver may convert the digital data into an analog data signal in response to the control signal and supply the analog data signal to the data lines DL.

The sensor driver 220 is electrically connected to the sensor unit 120 to drive the sensor unit 120. The sensor driver 220 may include a touch controller, an oscillator, and the like.

The touch controller may supply a touch signal to the first sensors TX (and/or the second sensors RX) so that a touch may be sensed, and receive a sensing signal corresponding to the touch signal from the second sensors RX (and/or the first sensors TX). To this end, the touch controller may include a sensor transmitter for supplying the touch signal and a sensor receiver for receiving the sensing signal.

The oscillator may generate a clock signal inside the sensor driver 220. The touch controller may divide the clock signal supplied from the oscillator to generate various control signals. For example, the touch controller may divide the clock signal to generate the touch signal.

Figure 2A:
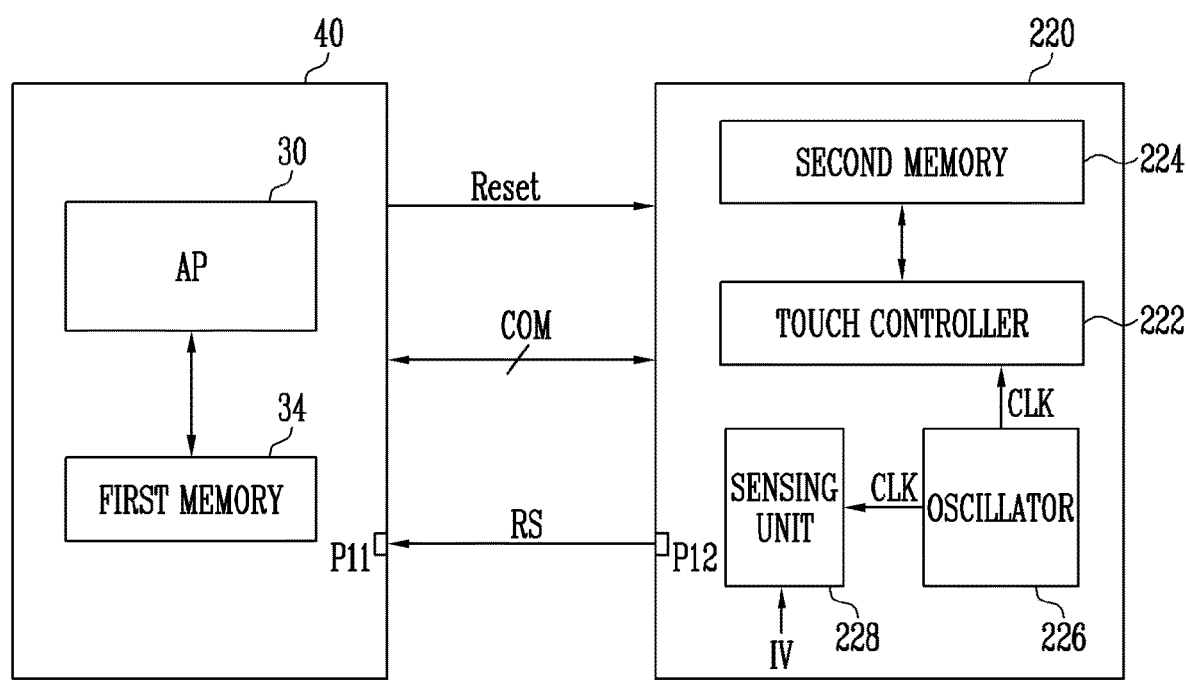
FIGS. 2A and 2B are diagrams illustrating a sensor driver and a host according to an embodiment of the disclosure.
Figure 2B:
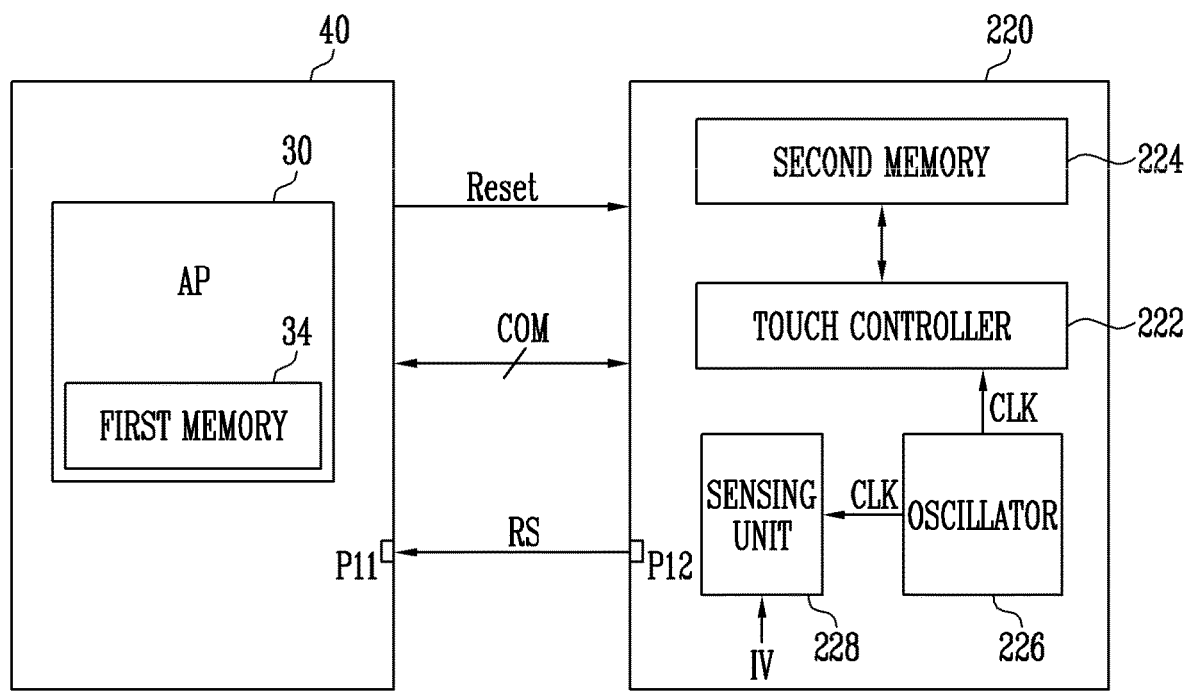

The application processor 30 may be included in a host 40 shown in FIGS. 2A and 2B and may be electrically connected to the display driver 210 and the sensor driver 220. The application processor 30 may provide grayscales (data) and timing signals for a display frame period to the display driver 210. In addition, the application processor 30 may provide timing signals and firmware to the sensor driver 220. The application processor 30 may correspond to at least one of a graphics processing unit (GPU), a central processing unit (CPU), and an application processor (AP).

Figure 3:
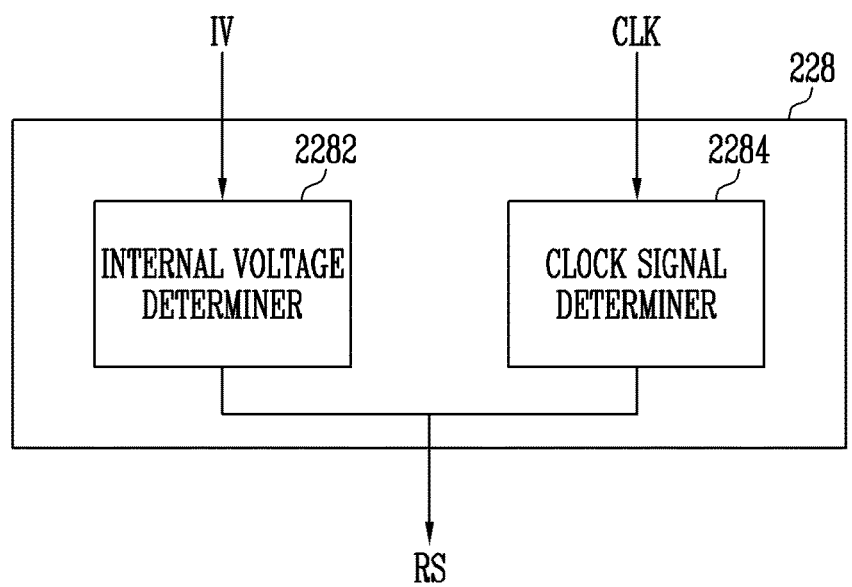
FIG. 3 is a diagram illustrating an embodiment of a sensing unit shown in FIGS. 2A and 2B.

FIGS. 2A and 2B are diagrams illustrating a sensor driver and a host according to an embodiment of the disclosure. FIG. 3 is a diagram illustrating an embodiment of a sensing unit shown in FIGS. 2A and 2B. In FIGS. 2A and 2B, only a configuration necessary for a description of the disclosure is shown.

Referring to FIGS. 2A and 2B, the host 40 (or a set) may receive various pieces of information necessary for driving the panel 10 and the driving circuit unit 20, process the received information, and transfer the processed information to drive the driving circuit unit 20. To this end, the host 40 may include an application processor 30 and a first memory 34. The host 40 may further include various configurations including a fingerprint sensor, a camera module, an antenna module, and a power module, which are not shown.

The application processor 30 and the sensor driver 220 may transmit and receive data using a communication channel COM of an interface. Here, the interface may be a display serial interface (DSI). For example, the interface may correspond to a MIPI interface and conform to an MIPI alliance specification for display serial interface and an MIPI alliance specification for D-PHY. However, this is an example, and the communication interface between the application processor 30 and the sensor driver 220 is not limited thereto.

For example, in order to transmit and receive data according to embodiments of the disclosure, a MIPI alliance specification for serial interface may be partially corrected. Alternatively, the interface may be configured as one of various serial high-speed interfaces supporting a high-definition image of n-high definition (nHD) or higher. The communication channel COM may have a channel (or a pin) conforming to an interface standard.

The application processor 30 may supply a reset signal Reset to the sensor driver 220 and receive a recovery signal RS from the sensor driver 220.

The reset signal Reset may be supplied from the application processor 30 to the sensor driver 220 using a reset channel different from the communication channel COM. The recovery signal RS may be supplied from the sensor driver 220 to the application processor 30 using a recovery channel different from the reset channel and the communication channel COM. A first terminal P11 may be installed in the host 40 (or the application processor 30) and a second terminal P12 may be installed in the sensor driver 220 in correspondence with the recovery channel. The first terminal P11 and the second terminal P12 may be electrically connected and may be used as the recovery channel.

The recovery signal RS is supplied from the sensor driver 220 to the application processor 30 via the recovery channel. The recovery signal RS may be a signal indicating that the sensor driver 220 is in an abnormal state. For example, the recovery signal RS may be generated when the touch input is not sensed by the sensor driver 220.

The reset signal Reset is supplied from the application processor 30 to the sensor driver 220 via the reset channel. The reset signal Reset may be supplied to the sensor driver 220 when the sensor driver 220 is not normally driven.

The application processor 30 may receive an interrupt signal from the sensor driver 220 at a regular period via the communication channel COM. When the interrupt signal is not normally input, the application processor 30 may supply the reset signal Reset to the sensor driver 220. In addition, the application processor 30 may supply the reset signal Reset to the sensor driver 220 when the recovery signal RS is input. In an embodiment, the application processor 30 may supply the firmware stored in the first memory 34 to a second memory 224 of the sensor driver 220 after supplying the reset signal Reset. That is, the application processor 30 may sequentially supply the reset signal Reset and the firmware.

The application processor 30 may be connected to the sensor driver 220 (or a touch controller 222) through the communication channel COM, the reset channel, and the recovery channel which are separated for each other. The communication channel COM may provide a transmission path of various data between the application processor 30 and the sensor driver 220. The communication channel COM may include a plurality of channels in correspondence with various interfaces.

The reset channel may be used as a transmission path of the reset signal Reset. In this case, the application processor 30 may transmit the reset signal Reset to the sensor driver 220 through the reset channel regardless of a priority of the data using the communication channel COM.

The recovery channel may be used as a transmission path of the recovery signal RS. In this case, the sensor driver 220 may transmit the recovery signal RS to the application processor 30 through the recovery channel regardless of the priority of the data using the communication channel COM.

Data necessary for driving the application processor 30 may be stored in the first memory 34. In addition, the firmware to be supplied to the sensor driver 220 may be stored in the first memory 34. To this end, the first memory 34 may be set as a nonvolatile flash memory.

The first memory 34 is included in the host 40 as shown in FIG. 2A and may be positioned outside the application processor 30, but the disclosure is not limited thereto. For example, the first memory 34 may be positioned inside the application processor 30 as shown in FIG. 2B. For example, the first memory 34 may be embedded in the application processor 30, for example, the application processor 30 and the first memory 34 may be implemented as one IC or the like.

The application processor 30 may receive the recovery signal RS from the sensor driver 220 through the recovery channel. The application processor 30 receiving the recovery signal RS may supply the reset signal Reset to the sensor driver 220 via the reset channel. When the reset signal Reset is supplied to the sensor driver 220, the sensor driver 220 may be initialized, and thus the sensor driver 220 may be reset to an initial state.

After the sensor driver 220 is initialized, the firmware stored in the first memory 34 may be supplied to the second memory 224 included in the sensor driver 220. In an embodiment, the firmware stored in the second memory 224 may be supplied to the second memory 224 via the communication channel COM by control of the application processor 30.

The sensor driver 220 may include the touch controller 222, the second memory 224, an oscillator 226, and a sensing unit 228. Here, at least one configuration among the second memory 224, the oscillator 226, and the sensing unit 228 may be embedded in the touch controller 222, for example, the touch controller 222 and one of the second memory 224, the oscillator 226, and the sensing unit 228 may be implemented as one IC or the like.

The oscillator 226 may generate a clock signal CLK to be used inside the sensor driver 220. When the clock signal is received from a oscillator which is disposed outside of the sensor driver 220, the oscillator 226 may be omitted in the sensor driver 220.

The touch controller 222 may control an overall operation of the sensor driver 220. For example, the touch controller 222 may supply the touch signal to the first sensors TX and receive the sensing signal corresponding to the touch signal from the second sensors RX. The touch controller 222 may divide the clock signal CLK to generate various signals. For example, the touch controller 222 may divide the clock signal CLK to generate the touch signal.

The second memory 224 may store the firmware supplied from the application processor 30. In addition, the second memory 224 may store various data necessary for driving the sensor driver 220. The second memory 224 may be set as a random access memory (RAM) which is a volatile memory.

The sensing unit 228 may sense an internal voltage IV and/or the clock signal CLK of the sensor driver 220 and generate the recovery signal RS in response to a sensing result. The recovery signal RS generated by the sensing unit 228 may be supplied to the application processor 30 via the recovery channel.

The sensing unit 228 may include an internal voltage determiner 2282 and/or a clock signal determiner 2284 as shown in FIG. 3.

The internal voltage determiner 2282 may sense an internal voltage of the sensor driver 220 and supply the recovery signal RS to the application processor 30 when the internal voltage is not in a predetermined range (or a first range). Here, the internal voltage may include an operation voltage of the touch controller 222 and/or a voltage of the touch signal. For example, the internal voltage may include various voltages used inside the sensor driver 220.

For example, when the operation voltage of the touch controller 222 is not in the predetermined range, a touch may not be normally sensed. For example, when the voltage of the touch signal is not in the predetermined range, the touch may not be normally sensed. Therefore, the internal voltage determiner 2282 may supply the recovery signal RS corresponding to an abnormal operation of the sensor driver 220 to the application processor 30 when the internal voltage is not in the predetermined range.

In an embodiment, first threshold values corresponding to the predetermined range of the internal voltage may be stored in the second memory 224. The first threshold values may include a lower limit value and an upper limit value of each of the internal voltages, and may be stored in the second memory 224 when the firmware is stored. To this end, the first threshold values may be stored together with the firmware in the first memory 34.

The clock signal determiner 2284 may sense a frequency of the clock signal CLK and supply the recovery signal RS to the application processor 30 when the frequency of the clock signal CLK is not in a predetermined range (or a second range). Here, the clock signal CLK is a signal for generating various signals (for example, the touch signal), and when the frequency of the clock signal CLK is not in the predetermined range, the touch may not be normally sensed. Therefore, the clock signal determiner 2284 may supply the recovery signal RS to the application processor 30 when the frequency of the clock signal CLK is not in the predetermined range.

In an embodiment, second threshold values corresponding to the predetermined range of the frequency of the clock signal may be stored in the second memory 224. The second threshold values may include an upper limit value and a lower limit value of the frequency of the clock signal, and may be stored in the second memory 224 when the firmware is stored. To this end, the second threshold values may be stored in the first memory 34 together with the firmware.

Figure 4:
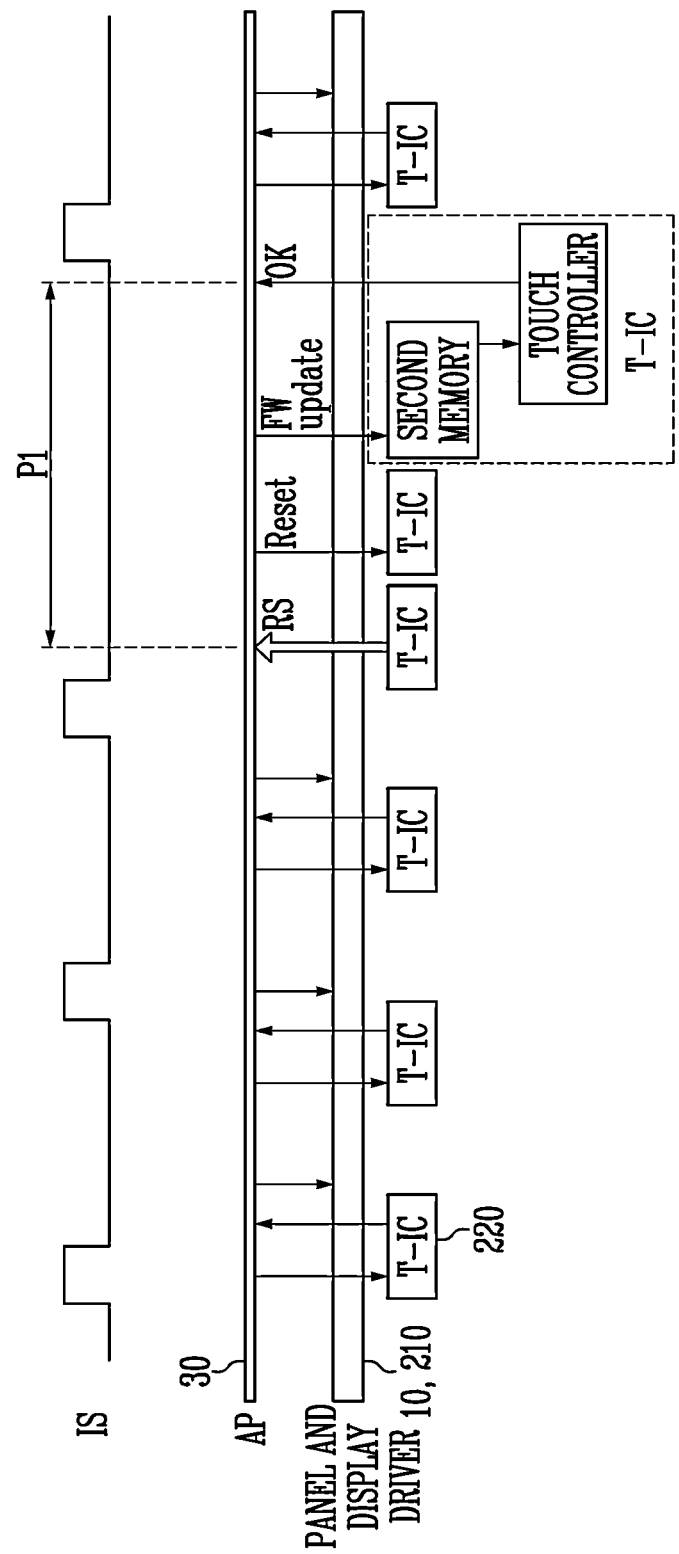
FIG. 4 is a diagram illustrating an operation process of an application processor and a sensor driver according to an embodiment of the disclosure.

FIG. 4 is a diagram illustrating an operation process of an application processor and a sensor driver according to an embodiment of the disclosure.

First, during an initial operation, the firmware, the first threshold values, and the second threshold values stored in the first memory 34 may be supplied to the second memory 224 under control of the application processor 30. After the firmware, the first threshold values, and the second threshold values are stored in the second memory 224, the touch controller 222 may be driven by loading the firmware.

Referring to FIGS. 1 to 4, the panel 10 may display a predetermined image in response to the data signal supplied from the display driver 210. In addition, the sensor driver 220 may sense the touch input while supplying the touch signal, and supply touch position information corresponding to the sensing signal to the application processor 30 using the communication channel COM. The application processor 30 may supply predetermined data corresponding to a touch position to the display driver 210, and predetermined information corresponding to the touch may be displayed on the panel 10 in response to the predetermined data.

The sensor driver 220 may supply an interrupt signal IS to the application processor 30 at a regular period through the communication channel COM. When the interrupt signal IS is input at the regular period, the application processor 30 may determine that the sensor driver 220 is normally driven.

The sensing unit 228 may determine whether the internal voltage IV is abnormal using the first threshold values and may determine whether the clock signal CLK is abnormal using the second threshold values. The sensing unit 228 may supply the recovery signal RS to the application processor 30 using the recovery channel when it is determined that the internal voltage IV or the clock signal CLK is abnormal. The sensing unit 228 may sense an operation of the sensor driver 220 regardless of the interrupt signal IS, and thus may sense an abnormality of the sensor driver 220 within a short time.

The application processor 30 receiving the recovery signal RS may supply the reset signal Reset to the touch controller 222 using the reset channel. The touch controller 222 receiving the reset signal Reset may initialize the sensor driver 220. For example, the touch controller 222 receiving the reset signal Reset may be rebooted. In this case, data stored in the second memory 224, which is a volatile memory, may also be deleted.

The application processor 30 supplying the reset signal Reset may transfer the firmware, the first threshold values, and the second threshold values stored in the first memory 34 to the second memory 224 through the communication channel COM. Then, the firmware, the first threshold values, and the second threshold values may be stored in the second memory 224.

The touch controller 222 may load the firmware stored in the second memory 224 and supply a signal (for example, an OK signal) corresponding thereto to the application processor 30. Thereafter, the touch controller 222 may sense the touch input from an outside while being normally driven.

Meanwhile, the sensor driver 220 may not sense the touch input during a first period P1 from a time point when the reset signal RS is supplied until the OK signal is supplied from the touch controller 222. However, the first period P1 may be set to a relatively short time, and user's discomfort (or user's recognition that the touch input is abnormal) may be minimized.

Figure 5:
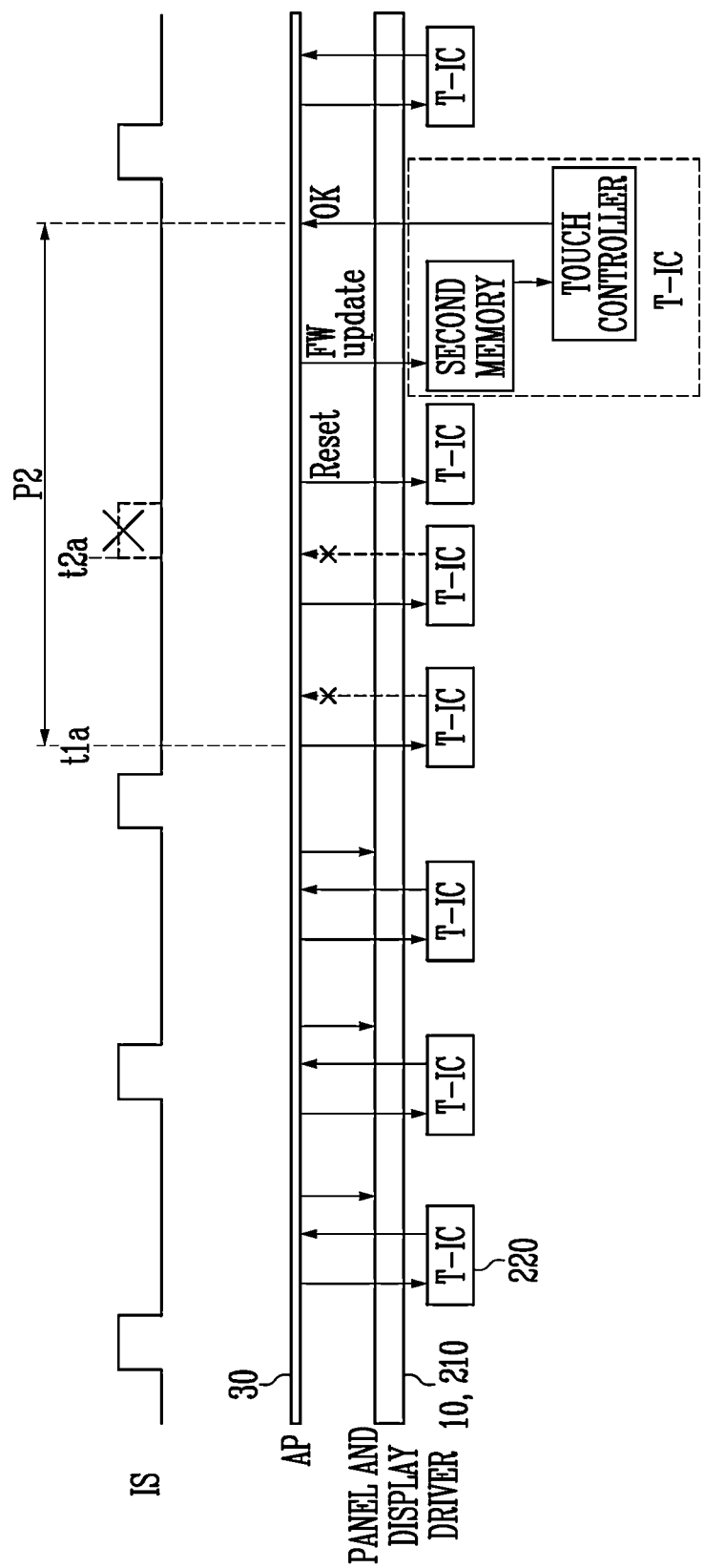
FIG. 5 is a diagram illustrating an operation process of an application processor and a sensor driver according to a comparative example.

FIG. 5 is a diagram illustrating an operation process of an application processor and a sensor driver according to a comparative example. The comparative example of FIG. 5 may indicate a case in which the sensing unit 228 and the recovery channel are omitted from the sensor driver 220 shown in FIG. 2.

First, during an initial operation, the firmware stored in the first memory 34 may be supplied to the second memory 224 under control of the application processor 30. After the firmware is stored in the second memory 224, the touch controller 222 may be driven by loading the firmware.

Referring to FIG. 5, the panel 10 may display a predetermined image in response to the data signal supplied from the display driver 210. In addition, the sensor driver 220 may sense the touch input while supplying the touch signal and supply touch position information corresponding to the sensing signal to the application processor 30 using the communication channel COM. The application processor 30 may supply predetermined data corresponding to a touch position to the display driver 210 and predetermined information corresponding to the touch may be displayed on the panel 10 in response to the predetermined data.

The sensor driver 220 may supply an interrupt signal IS to the application processor 30 at a regular period. When the interrupt signal IS is input at the regular period, the application processor 30 may determine that the sensor driver 220 is normally driven.

Meanwhile, after the interrupt signal IS is supplied, the sensor driver 220 may be abnormally driven. For example, the touch input may not be sensed due to an increase (or a decrease) of the internal voltage IV of the sensor driver 220, a change in the frequency of the clock signal CLK, or the like.

Even though the sensor driver 220 does not sense the touch input, the application processor 30 may not sense whether the sensor driver 220 is abnormal or not until a next interrupt signal IS is supplied, for example, until a second time point t2a. In this case, the touch input is not sensed between the first time point t1a and the second time point t2a.

When the interrupt signal is not input at the second time point t2a, the application processor 30 may supply the reset signal Reset to the touch controller 222 using the reset channel. The touch controller 222 receiving the reset signal Reset may initialize the sensor driver 220. For example, the touch controller 222 receiving the reset signal Reset may be rebooted. In this case, data stored in the second memory 224, which is a volatile memory, may also be deleted.

The application processor 30 supplying the reset signal Reset may transfer the firmware stored in the first memory 34 to the second memory 224 through the communication channel COM. Then, the firmware may be stored in the second memory 224.

The touch controller 222 may load the firmware stored in the second memory 224 and supply an OK signal corresponding to the firmware loaded to the application processor 30. Thereafter, the touch controller 222 may sense the touch input from an outside while being normally driven.

Meanwhile, the sensor driver 220 may not sense the touch input during a second period P2 from a first time point t1a until the OK signal is supplied from the touch controller 222. The second period P2 may be set to a relatively long time, and thus may cause user discomfort (or the user recognizes that the touch input is abnormal).

Figure 6:
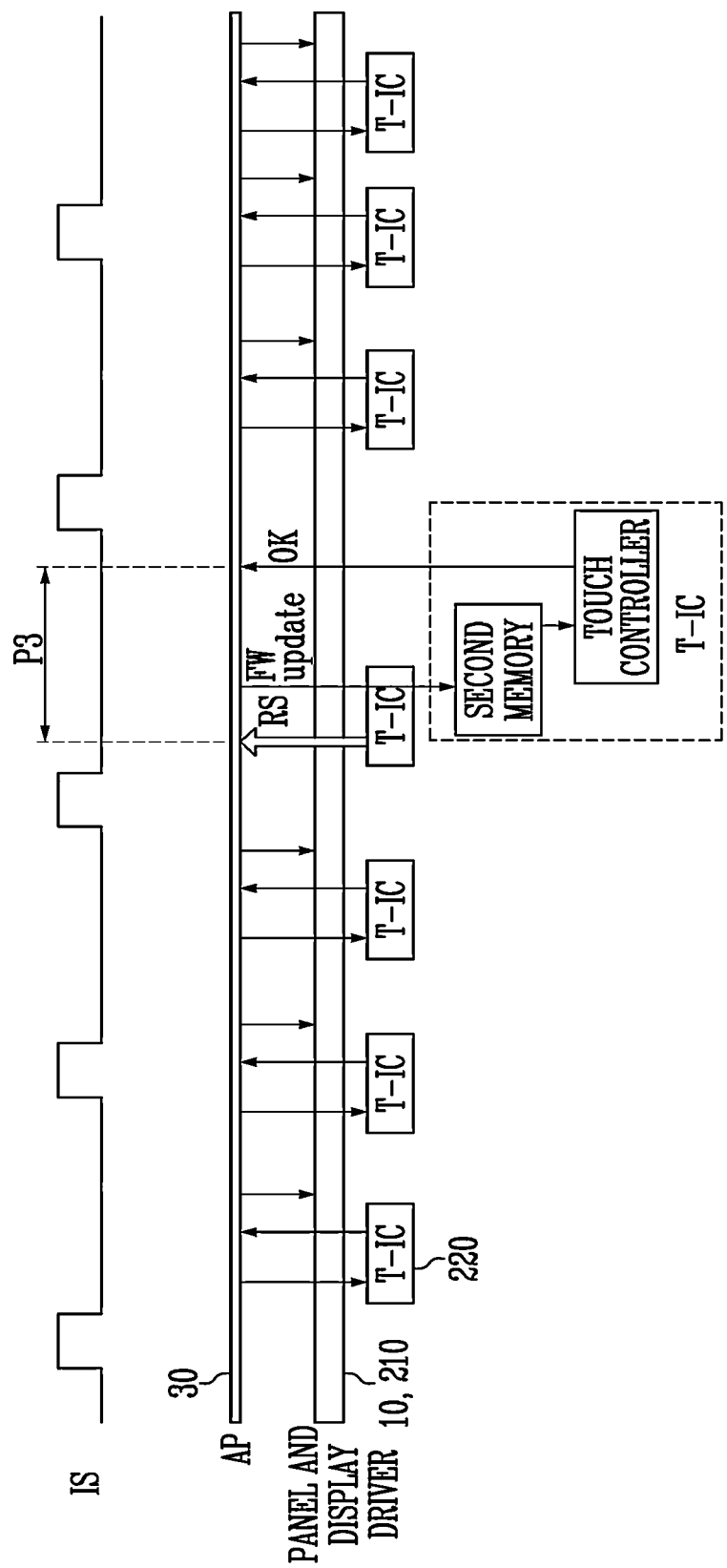
FIG. 6 is a diagram illustrating an operation process of an application processor and a sensor driver according to an embodiment of the disclosure.

FIG. 6 is a diagram illustrating an operation process of an application processor and a sensor driver according to an embodiment of the disclosure. When describing FIG. 6, a portion overlapping that of FIG. 4 is briefly described.

Referring to FIG. 6, when it is determined that the internal voltage IV or the clock signal CLK is abnormal, the sensing unit 228 may supply the recovery signal RS to the application processor 30 using the recovery channel.

The application processor 30 receiving the recovery signal RS may transfer the firmware, the first threshold values, and the second threshold values stored in the first memory 34 to the second memory 224 using the communication channel COM. Then, the firmware, the first threshold values, and the second threshold values may be stored in the second memory 224.

After the firmware is stored in the second memory 224, the touch controller 222 may load the firmware stored in the second memory 224. In this case, the touch controller 222 may sense the touch input from the outside while being driven in a normal state.

For example, when the touch controller 222 is driven in the normal state, the internal voltage IV generated by control of the touch controller 222 may have a desired voltage. For example, when the touch controller 222 is driven in the normal state, the clock signal CLK generated under the control of the touch controller 222 may have a desired frequency.

In a case of FIG. 6, a process of supplying the reset signal Reset from the application processor AP to the sensor driver 220 may be omitted compared to FIG. 4, and thus the touch input may not be sensed only during a third period P3 shorter than the first period P1. However, when the reset signal Reset is not supplied, the sensor driver 220 may maintain the abnormal state.

Therefore, in an embodiment of the disclosure, the embodiment of FIG. 4 or 6 may be applied in response to the abnormal state of the sensor driver 220. For example, when the frequency of the clock signal CLK exceeds the predetermined range, the sensor driver 220 may be initialized by supplying the reset signal Reset as shown in FIG. 4. For example, when the internal voltage IV of the touch controller 222 exceeds the predetermined range, the firmware of the touch controller 222 may be reset without an initialization process as shown in FIG. 6.

Meanwhile, in an embodiment of the disclosure, the sensing unit 228 may supply the reset signal Reset to the application processor 30 at a regular period. In this case, the sensor driver 220 may be initialized at the regular period, and thus reliability of a touch operation may be secured.

Figure 7:
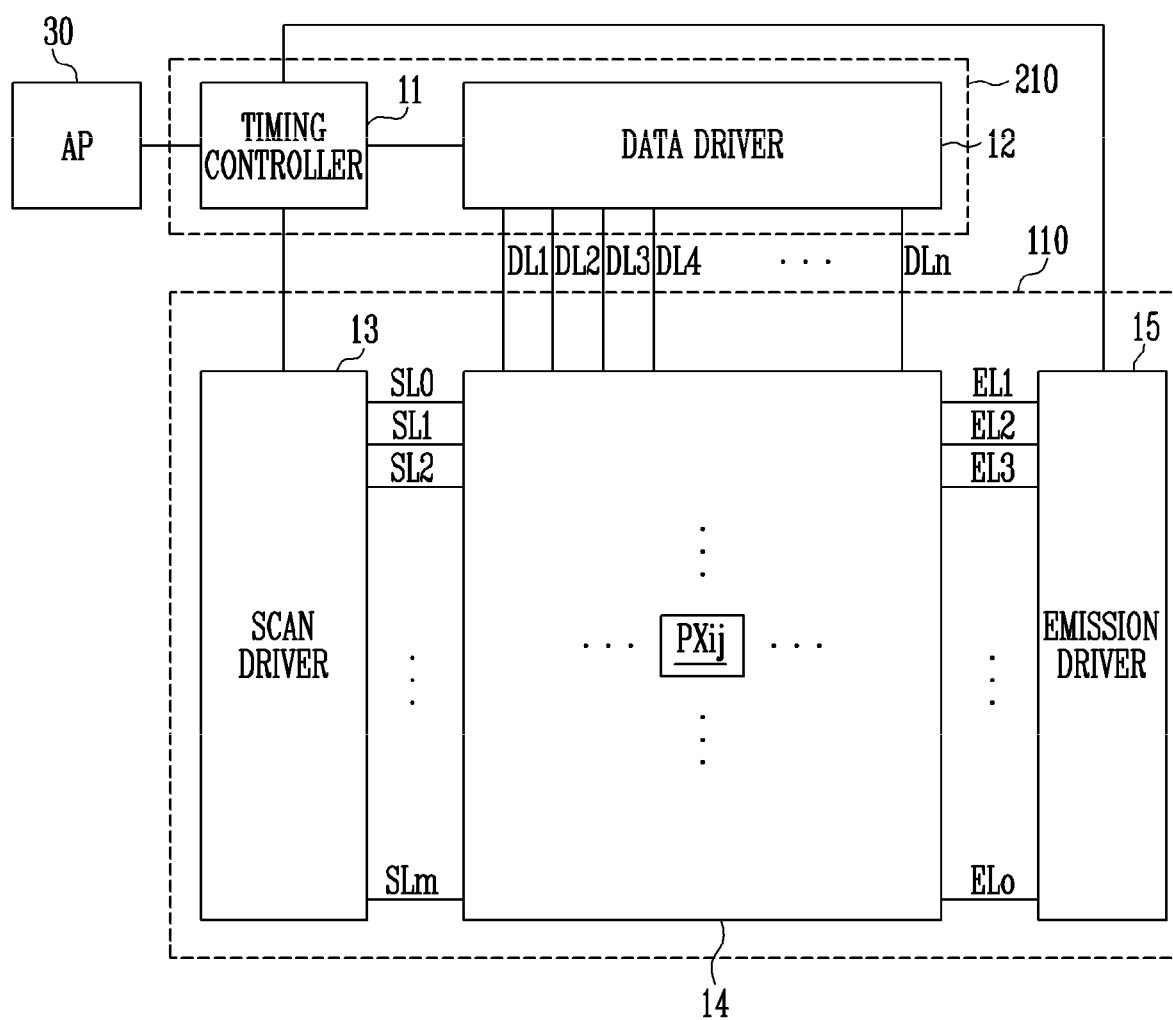
FIG. 7 is a diagram illustrating a display unit and a display driver according to an embodiment of the disclosure.

FIG. 7 is a diagram illustrating a display unit and a display driver according to an embodiment of the disclosure.

Referring to FIG. 7, the display driver 210 may include a timing controller 11 and a data driver 12, and the display unit 110 may include a scan driver 13 and an emission driver 15. However, as described above, whether each functional unit is integrated into one IC, into a plurality of ICs, or mounted on the display substrate 111 may be variously configured according to a specification of the display device 1.

The timing controller 11 may receive grayscales and timing signals for each display frame period from the application processor 30. The grayscales may be supplied in a horizontal line unit in each horizontal period. The horizontal line may refer to a pixel row in which pixels connected to the same scan line are positioned.

The timing controller 11 may render the grayscales to correspond to the specification of the display device 1 (or the pixel unit 14). For example, an application processor 30 may provide a red grayscale, a green grayscale, and a blue grayscale for each unit dot. For example, when the pixel unit 14 has an RGB stripe structure, the pixel may correspond to each grayscale one-to-one. In this case, rendering of the grayscales may be unnecessary. However, for example, when the pixel unit 14 has a PENTILE™ structure, since adjacent unit dots share the pixel, the pixel may not correspond to each grayscale one-to-one. In this case, rendering of the grayscales may be necessary. The grayscales which are rendered or not rendered may be provided to the data driver 12. In addition, the timing controller 11 may provide a data control signal to the data driver 12. In addition, the timing controller 11 may provide a scan control signal to the scan driver 13.

The data driver 12 may generate data signals to be provided to data lines DL1 to DLn (for example, n is a natural number) using the grayscales and the data control signal received from the timing controller 11.

The scan driver 13 may generate scan signals to be provided to scan lines SL0 to SLm (for example, m is a natural number) using a clock signal, a scan start signal, and the like received from the timing controller 11. The scan driver 13 may sequentially supply scan signals having a turn-on level of pulse to the scan lines SL0 to SLm. For example, the scan driver 13 may supply turn-on level of scan signals to the scan lines at a cycle corresponding to a cycle of a horizontal synchronization signal Hsync during an active period in which the grayscales are supplied. The scan driver 13 may include scan stages configured in a form of a shift register. The scan driver 13 may generate the scan signals in a method of sequentially transferring the scan start signal which is a pulse form of a turn-on level to a next scan stage under control of the clock signal.

The emission driver 15 may generate emission signals to be provided to emission lines EL1 to ELo using an emission control signal (for example, a clock signal, an emission stop signal, and the like) received from the timing controller 11. The emission driver 15 may sequentially supply emission signals having a turn-off level of pulse to the emission lines EL1 to ELo. The emission driver 15 may include emission stages configured in a form of a shift register. The emission driver 15 may generate the emission signals in a method of sequentially transferring the emission stop signal which is a pulse form of a turn-off level to a next emission stage according to control of the clock signal.

The pixel unit 14 includes the pixels PX. Each of the pixels PX may be connected to corresponding data line and scan line. For example, the pixel PXij may be connected to an i-th scan line and a j-th data line. The pixels may include pixels emitting light of a first color, pixels emitting light of a second color, and pixels emitting light of a third color. The first color, the second color, and the third color may be different colors. For example, the first color may be one of red, green, and blue, the second color may be one other than the first color among red, green, and blue, and the third color may be one other than the first color and the second color among red, green, and blue. In addition, magenta, cyan, and yellow may be used instead of red, green, and blue as the first to third colors.

Figure 8:
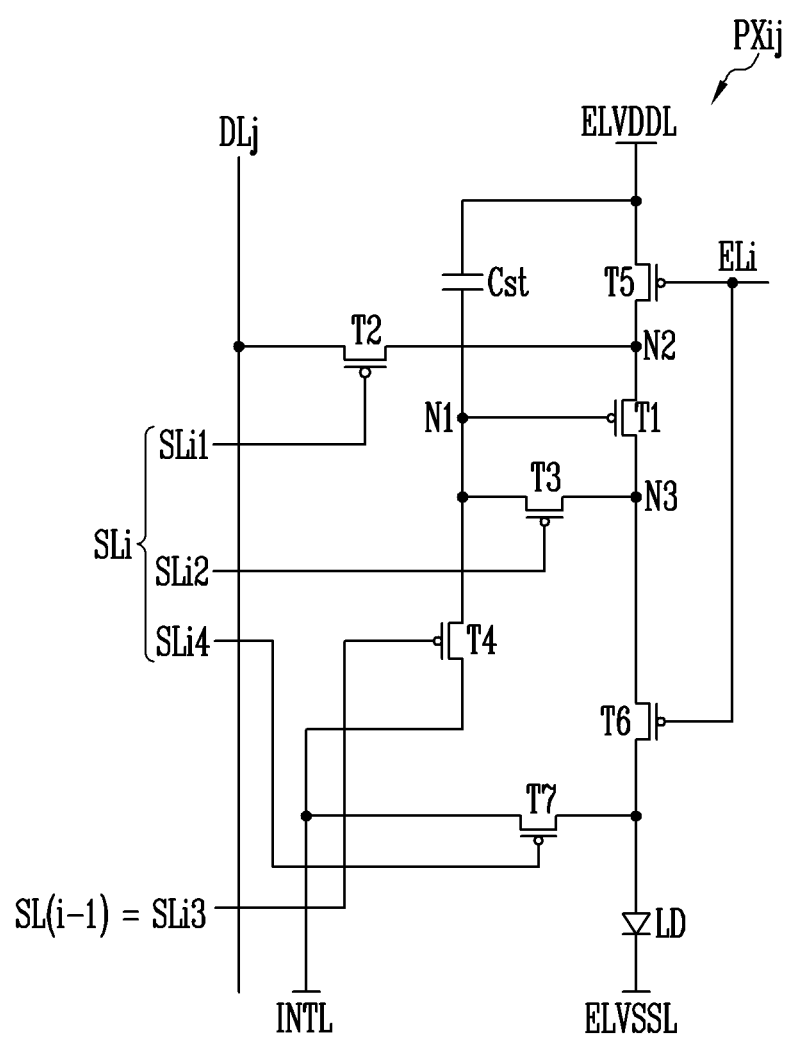
FIG. 8 is a diagram illustrating a pixel according to an embodiment of the disclosure.

FIG. 8 is a diagram illustrating a pixel according to an embodiment of the disclosure.

Referring to FIG. 8, the pixel PXij includes transistors T1, T2, T3, T4, T5, T6, and T7, a storage capacitor Cst, and a light emitting element LD.

Hereinafter, a circuit configured of a P-type transistor is described as an example. However, those skilled in the art will be able to design a circuit configured of an N-type transistor by differentiating a polarity of a voltage applied to a gate terminal. Similarly, those skilled in the art will be able to design a circuit configured of a combination of a P-type transistor and an N-type transistor. The transistor may be configured in various forms such as a thin film transistor (TFT), a field effect transistor (FET), and a bipolar junction transistor (BJT).

The first transistor T1 may have a gate electrode connected to a first node N1, a first electrode connected to a second node N2, and a second electrode connected to a third node N3. The first transistor T1 may be referred to as a driving transistor.

The second transistor T2 may have a gate electrode connected to a scan line SLi1, a first electrode connected to a data line DLj, and a second electrode connected to the second node N2. The second transistor T2 may be referred to as a scan transistor.

The third transistor T3 may have a gate electrode connected to a scan line SLi2, a first electrode connected to the third node N3, and a second electrode connected to the first node N1. The third transistor T3 may be referred to as a diode connection transistor.

The fourth transistor T4 may have a gate electrode connected to a scan line SLi3, a first electrode connected to the first node N1, and a second electrode connected to an initialization line INTL. The fourth transistor T4 may be referred to as a gate initialization transistor.

The fifth transistor T5 may have a gate electrode connected to an i-th emission line Eli, a first electrode connected to a first power line ELVDDL, and a second electrode connected to the second node N2. The fifth transistor T5 may be referred to as an emission transistor.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In another embodiment, the gate electrode of the sixth transistor T6 may be connected to an emission line different from the emission line connected to the gate electrode of the fifth transistor T5.

The seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power line ELVDDL and a second electrode may be connected to the first node N1.

The anode of the light emitting element LD may be connected to the second electrode of the sixth transistor T6 and a cathode may be connected to a second power line ELVSSL. The light emitting element LD may be a light emitting diode. The light emitting element LD may be configured of an organic light emitting element (organic light emitting diode), an inorganic light emitting element (inorganic light emitting diode), a quantum dot/well light emitting element (quantum dot/well light emitting diode), or the like. The light emitting element LD may emit light in any one of the first color, the second color, and the third color. In addition, although only one light emitting element LD is provided in each pixel in the present embodiment, a plurality of light emitting elements may be provided in each pixel in another embodiment. At this time, the plurality of light emitting elements may be connected in series, parallel, series-parallel, or the like.

The first power line ELVDDL may be supplied with a first power voltage, the second power line ELVSSL may be supplied with a second power voltage, and the initialization line INTL may be supplied with an initialization voltage. For example, the first power voltage may be greater than the second power voltage. For example, the initialization voltage may be equal to or greater than the second power voltage. For example, the initialization voltage may correspond to a data signal of the smallest voltage among data signals that may be provided. In another example, the initialization voltage may be less than a voltage of the data signals that may be provided.

Figure 9:
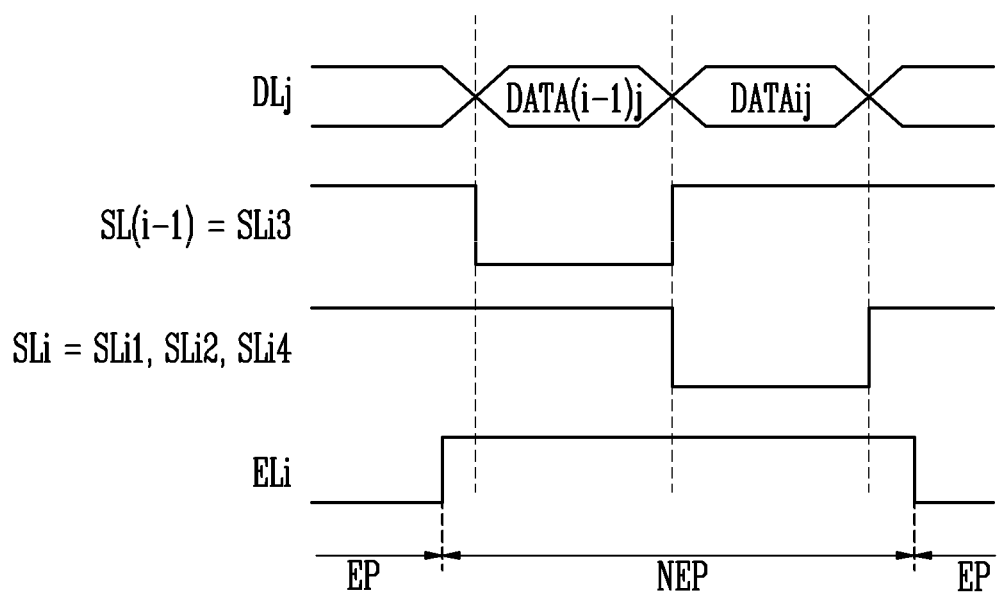
FIG. 9 is a diagram illustrating a method of driving the pixel of FIG. 8.

FIG. 9 is a diagram illustrating a method of driving the pixel of FIG. 8.

Hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be various according to embodiments. For example, the scan line SLi4 may be the (i−1)-th scan line or an (i+1)-th scan line.

First, an emission signal of a turn-off level (logic high level) is applied to the i-th emission line ELi, a data signal DATA(i−1)j for an (i−1)-th pixel is applied to the data line DLj, and a scan signal of a turn-on level (logic low level) is applied to the scan line SLi3. The high/low of the logic level may vary according to whether a transistor is a P-type or an N-type.

At this time, since a scan signal of a turn-off level is applied to the scan lines SLi1 and SLi2, the second transistor T2 is turned off and the data signal DATA(i−1)j is prevented from being input to the pixel PXij.

At this time, since the fourth transistor T4 is turned on, the first node N1 is connected to the initialization line INTL and a voltage of the first node N1 is initialized. Since the emission signal of the turn-off level is applied to the emission line Ei, the transistors T5 and T6 are turned off, and light emission of an unnecessary light emitting element LD according to an initialization voltage application process is prevented.

Next, a data signal DATAij for the i-th pixel PXij is applied to the data line DLj, and the scan signal of the turn-on level is applied to the scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data signal DATAij is applied to the second electrode of the storage capacitor Cst (that is, the first node N1), and the storage capacitor Cst maintains a voltage corresponding to a difference between the first power voltage and the compensation voltage. Such a period may be referred to as a threshold voltage compensation period or a data writing period.

In addition, when the scan line SLi4 is the i-th scan line, since the seventh transistor T7 is turned on, the anode of the light emitting element LD and the initialization line INTL are connected with each other, and the light emitting element LD is initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a current path connecting the first power line ELVDDL, the fifth transistor T5, the first transistor T1, the sixth transistor T6, the light emitting element LD, and the second power line ELVSSL is formed.

A driving current amount flowing to the first electrode and the second electrode of the first transistor T1 is adjusted according to the voltage maintained in the storage capacitor Cst. The light emitting element LD emits light with a luminance corresponding to the driving current amount. The light emitting element LD emits light until the emission signal of the turn-off level is applied to the emission line Ei.

When the emission signal is the turn-on level, pixels receiving the corresponding emission signal may be in a display state. Therefore, a period in which the emission signal is the turn-on level may be referred to as an emission period EP (or an emission allowable period). In addition, when the emission signal is the turn-off level, pixels receiving the corresponding emission signal may be in a non-display state. Therefore, a period in which the emission signal is the turn-off level may be referred to as a non-emission period NEP (or an emission disallowable period).

The non-emission period NEP described with reference to FIG. 4 is for preventing the pixel PXij from emitting light with an undesired luminance during the initialization period and the data writing period.

One or more non-emission periods NEP may be additionally provided while data written to the pixel PXij is maintained (for example, one frame period). This may be for effectively expressing a low grayscale by reducing the emission period EP of the pixel PXij, or for smoothly blurring a motion of an image.

Although the disclosure has been described with reference to the embodiments of the disclosure, those skilled in the art will understand that the disclosure may be variously corrected and modified within the scope without departing from the spirit and scope of the disclosure described in the claims.

What is claimed is:

1. A display device comprising:
   a sensor driver receiving firmware from a host in which the firmware is stored, the sensor driver being initialized when a reset signal is supplied from the host, the sensor driver including:
   a second memory storing the firmware supplied from the host, and
   a sensing unit for supplying a recovery signal corresponding to an abnormal state of the sensor driver to the host while sensing an internal voltage and a clock signal of the sensor driver,
   wherein the sensing unit further comprises a clock signal determiner which receives the clock signal of the sensor driver and generates the recovery signal when a frequency of the clock signal of the sensor driver is not within a predetermined range.

2. The display device according to claim 1, wherein the recovery signal is supplied from the sensor driver to an application processor disposed in the host through a recovery channel, and
   wherein the recovery channel comprises:
   a first terminal included in the host and receiving the recovery signal; and
   a second terminal included in the sensor driver and outputting the recovery signal.

3. The display device according to claim 1, wherein the host includes an application processor which sequentially supplies the reset signal and the firmware to the sensor driver when the recovery signal is input.

4. The display device according to claim 1, wherein the host includes an application processor which supplies the firmware to the sensor driver when the recovery signal is input.

5. The display device according to claim 1, wherein the host includes a first memory which is a nonvolatile memory, and
   wherein the second memory is a volatile memory.

6. The display device according to claim 1, wherein the sensing unit comprises:
   an internal voltage determiner for receiving the internal voltage and generating the recovery signal when the internal voltage is not within a first range.

7. The display device according to claim 6, wherein first threshold values corresponding to the first range and second threshold values are stored in the second memory.

8. The display device according to claim 7, wherein the first threshold values and the second threshold values are stored in the first memory, and supplied to the second memory together with the firmware.

9. The display device according to claim 1, wherein the host includes an application processor which includes a first memory.

10. The display device according to claim 1, wherein the reset signal is supplied via a reset channel.

11. The display device according to claim 1, wherein the host includes an application processor which supplies the firmware stored in a first memory in the host to the second memory using a communication channel.

12. The display device according to claim 1, wherein the sensor driver further includes a touch controller for generating a touch signal by dividing the clock signal.

13. The display device according to claim 1, further comprising:
    a display driver for generating a data signal corresponding to data supplied from an application processor in the host; and
    a panel displaying a predetermined image in response to the data signal supplied from the display driver.

14. A display device comprising:
    an application processor;
    a sensor driver for sensing a touch input;
    a communication channel connected between the application processor and the sensor driver for transmitting and receiving data;
    a reset channel connected between the application processor and the sensor driver for transmitting a reset signal corresponding to initialization of the sensor driver; and
    a recovery channel connected between the application processor and the sensor driver for transmitting a recovery signal corresponding to an abnormal state of the sensor driver,
    wherein the sensor driver comprises a clock signal determiner which receives a clock signal of the sensor driver and generates the recovery signal when a frequency of the clock signal of the sensor driver is not within a predetermined range.

15. The display device according to claim 14, wherein the reset signal is supplied from the application processor to the sensor driver, and wherein the recovery signal is supplied from the sensor driver to the application processor when an internal voltage of the sensor driver is not within a first range.

16. The display device according to claim 14, wherein the recovery channel comprises:
    a first terminal included in the application processor and receiving the recovery signal; and
    a second terminal included in the sensor driver and outputting the recovery signal.

17. A method of driving a display device, the method comprising:
    sensing a touch input in a sensor driver;
    sensing an internal voltage and a frequency of a clock signal of the sensor driver;
    generating a recovery signal and transferring the recovery signal to an application processor when the internal voltage is not within a first range or the frequency of the clock signal is not within a second range; and
    sequentially supplying a reset signal and firmware from the application processor to the sensor driver.

18. The method according to claim 17, wherein the sensor driver loads the firmware after the sensor driver is initialized by the reset signal.

19. The method according to claim 17, wherein first threshold values corresponding to the first range and second threshold values corresponding to the second range are supplied from the application processor to the sensor driver together with the firmware.

20. The method according to claim 17, wherein the recovery signal is transmitted through a recovery channel which is different from a communication channel for transmitting and receiving data between the application processor and the sensor driver and a reset channel through which the reset signal is transmitted from the application processor to the sensor driver.

* * * * *